United States Patent
Traylor

(10) Patent No.: US 6,318,672 B1
(45) Date of Patent: Nov. 20, 2001

(54) AIRCRAFT CABINET MOUNTING STRUCTURE

(75) Inventor: David L. Traylor, Towanda, KS (US)

(73) Assignee: Cessna Aircraft Company, Wichita, KS (US)

( * ) Notice: Subject to any disclaimer, the term of this patent is extended or adjusted under 35 U.S.C. 154(b) by 0 days.

(21) Appl. No.: 09/421,199

(22) Filed: Oct. 15, 1999

Related U.S. Application Data

(60) Provisional application No. 60/104,580, filed on Oct. 16, 1998.

(51) Int. Cl.⁷ .................................................... B64D 11/00
(52) U.S. Cl. ................................... 244/118.5; 244/129.1; 312/107; 312/111; 312/140; 248/200; 248/314; 248/224.7
(58) Field of Search ............................ 244/118.5, 129.1, 244/131; 312/107, 111, 140, 245; 248/200, 314, 220.21, 224.7

(56) References Cited

U.S. PATENT DOCUMENTS

| | | | |
|---|---|---|---|
| 4,456,206 | * | 6/1984 | Tijssen ............................ 244/118.5 |
| 4,576,355 | * | 3/1986 | Graf .................................. 248/544 |
| 5,393,013 | * | 2/1995 | Schneider et al. ............. 244/118.5 |
| 5,842,668 | * | 12/1998 | Spencer ......................... 244/118.1 |
| 6,182,937 | * | 2/2001 | Sanderse ........................... 248/466 |

* cited by examiner

*Primary Examiner*—J. Woodrow Eldred
(74) *Attorney, Agent, or Firm*—Edward L. Brown, Jr.

(57) ABSTRACT

The invention provides a quick disconnect mounting system for cabinets and partitions which entails only the removal of one or two bolt fasteners on the bottom of the cabinet and a pair of retractable pin fasteners on the upper portions of the cabinet, with an optional retractable pin fastener in the center rear of the cabinet. Each of these acoustical mounts are insulated, thus preventing vibration in the structural portion of the fuselage from entering the passenger compartment.

7 Claims, 3 Drawing Sheets

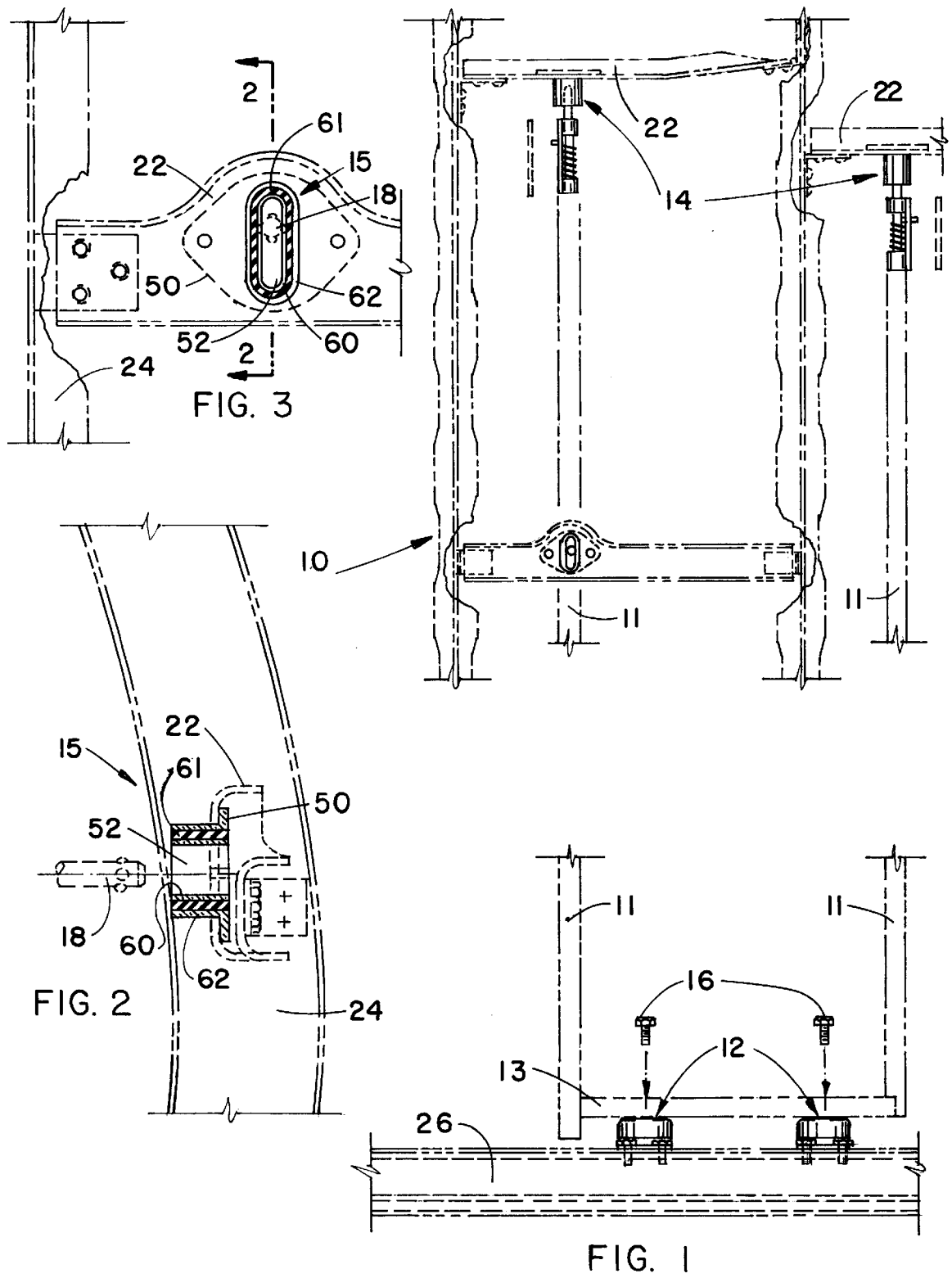

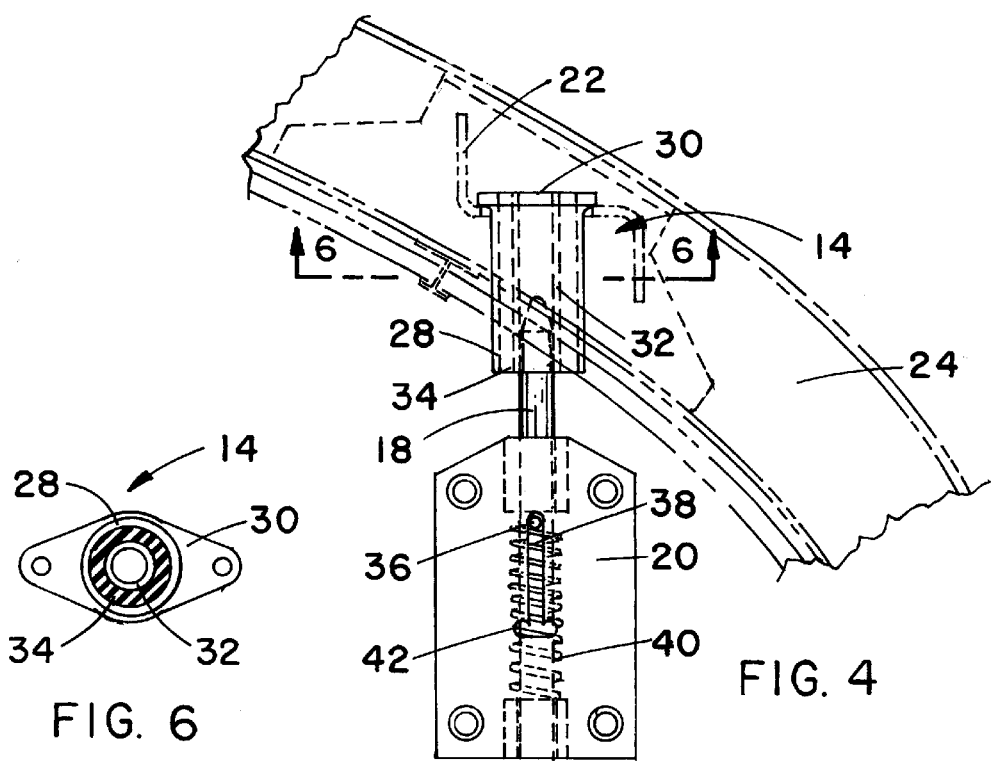
FIG. 4
FIG. 6
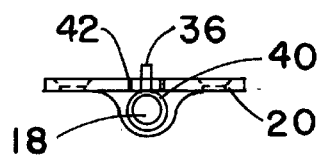
FIG. 5
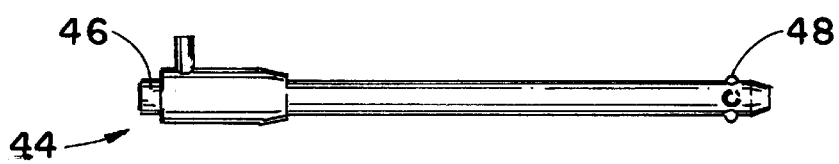
FIG. 7
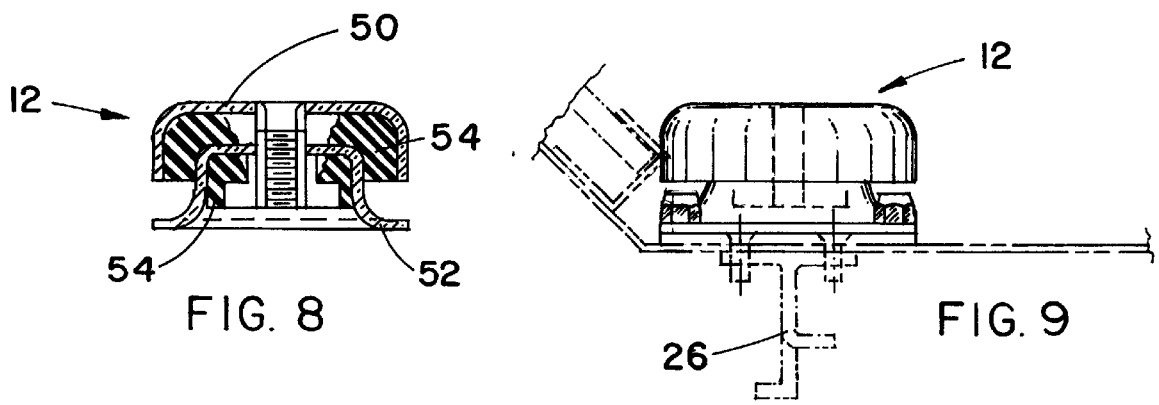
FIG. 8
FIG. 9

AIRCRAFT CABINET MOUNTING STRUCTURE

This application claims benefit of Provisional No. 60/104,580, filed Oct. 16, 1998.

BACKGROUND OF THE INVENTION

Aircraft passenger cabins must be insulated from vibration and noise caused by the slip stream of air and engine and propeller vibration. The walls, ceiling and floor are insulated by the use of insulated panels surrounding the cabin. Aircraft cabinets are mounted to structural members of an aircraft fuselage; however, their mounts must be insulated to prevent the vibration and exterior noise from entering the passenger area. In the prior art, cabinets and partitions have numerous shock-mounted attachment points, all of which take much time to mount and remove.

SUMMARY OF THE INVENTION

The present invention provides a quick disconnect mounting system for cabinets and partitions which entails only the removal of one or two bolt fasteners on the bottom of the cabinet and a pair of retractable pin fasteners on the upper portions of the cabinet, with an optional retractable pin fastener in the center rear of the cabinet. Each of these acoustical mounts are insulated, thus preventing vibration in the structural portion of the fuselage from entering the passenger compartment.

DESCRIPTION OF THE DRAWINGS

FIG. 1 is a front elevational view of an aircraft cabinet mounted to the structural elements of the fuselage;

FIG. 2 is a sectional view of an acoustical mount taken along line 2—2 of FIG. 3;

FIG. 3 is a front view of an oblong acoustical mount mounted to the longeron of the fuselage;

FIG. 4 is a front elevational view of the upper acoustical mount being engaged by a sliding pin;

FIG. 5 is a sectional view taken along line 5—5 of FIG. 4;

FIG. 6 is an end view of the upper mount attached to the fuselage;

FIG. 7 is a side view of an alternate sliding pin structure;

FIG. 8 is a sectional view through the center of the lower acoustical mount;

FIG. 9 is a side view of the lower mount and its support structure in the aircraft fuselage.

DESCRIPTION OF THE PREFERRED EMBODIMENT

Figure 10:
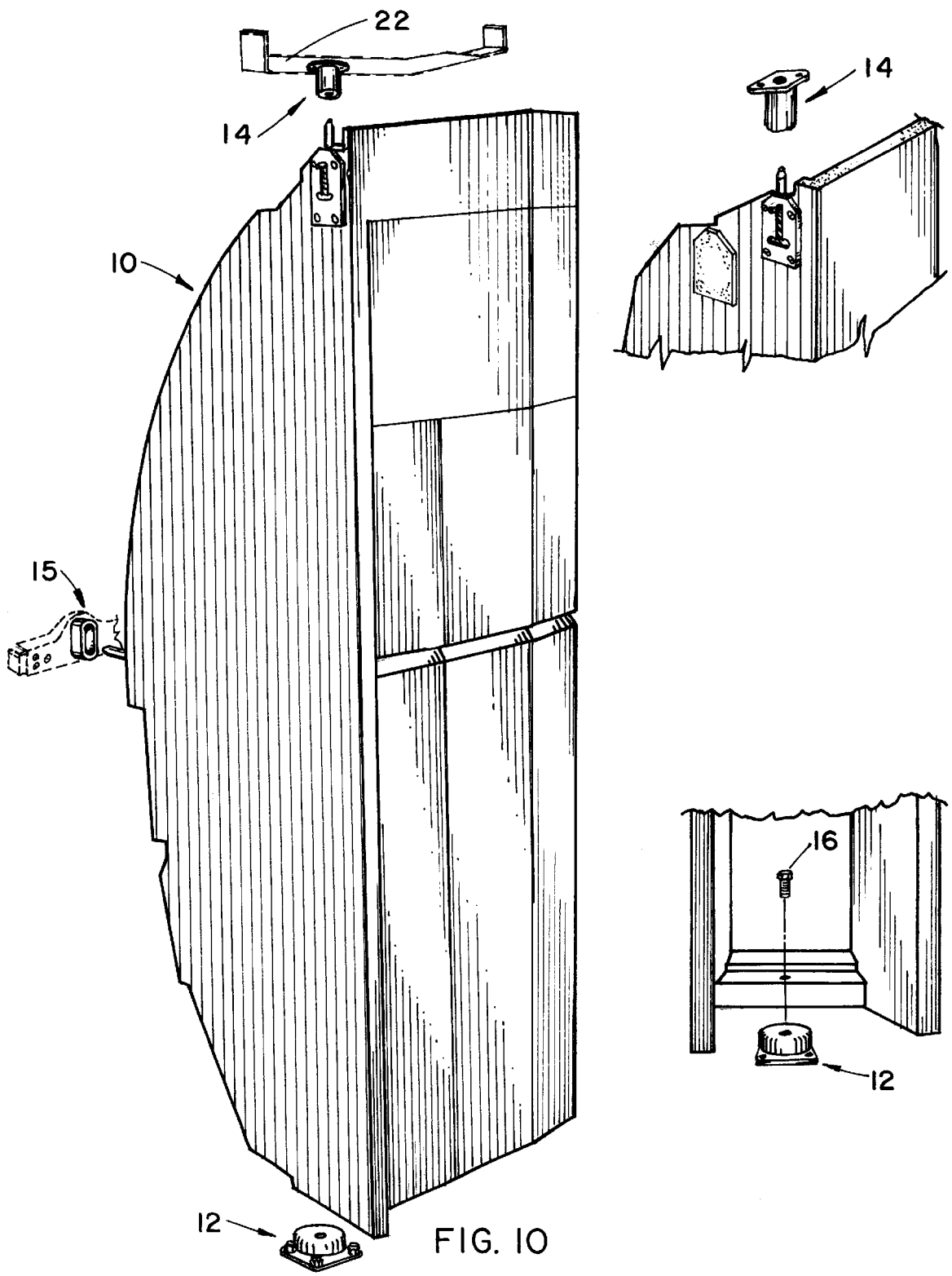
FIG. 10 is a perspective view of the aircraft cabinet and its upper, lower and back acoustical mounts.

The cabinet-mounting system of the present invention is generally shown in FIG. 10, while the detailed structure of the various mounts are shown in FIGS. 2 through 9. The weight of the cabinet and its contents are basically supported by a pair of lower insulated or shock mounts 12 which are seen in FIG. 10 and shown in detail in FIGS. 8 and 9. The donut-shaped mounts 12 include a steel cup 50 upper surface which is separated from the mounting bracket 52 by a pair of elastomer rings 54 and 55 which provide the necessary insulation. Lower mounts 12 are bolted to the seat rails of the aircraft 26, as shown in FIG. 9, which are in turn attached to the fuselage structure. Insulated mounts of this type are well known in the art and are not described in detail.

The upper end of cabinet 10 is mounted to an upper acoustical sleeve mount 14 which is shown in FIGS. 4, 6 and 10. The mount 14, as seen in FIG. 6, includes a pair of concentrically positioned steel sleeves 28 and 32, separated by an elastomer sleeve 34. Lateral mounting plate 30 with two mounting holes is attached to the outer sleeve 28. Mounting plate 30 is in turn attached by conventional fasteners to intercostal 22 which in turn is attached to the adjacent bulkheads 24 in the fuselage. Mount 14 is engaged by a retractable sliding pin 18, as seen in FIG. 4, which is held by a support bracket 20. Pin 18 is spring biased to its extended position, as seen in FIG. 4, by a compression spring 38. A roll pin 36 extending laterally from pin 18 provides a means to retract pin 18 to its retracted position by engaging roll pin 36 in notch 42. While mount 14 carries no gravity load, it does restrain the cabinet from any sideways or fore and aft movement.

A third back mount 15, as shown in FIGS. 2, 3 and 10, can optionally be used. Mount 15 includes a similar sliding pin 18 and pin support bracket 20, as previously discussed. However, the mount 15 includes a vertically positioned slot 52 instead of a round opening surrounding pin 18, thus permitting vertical movement of pin 18 while restraining any longitudinal movement of pin 18. Mount 15 includes a mounting plate 50 with two mounting holes, as seen in FIG. 3. The elastomer sleeve 61 is oblong as is the inner and outer metal sleeves 60 and 62. Back mount 15 is likewise mounted to a structural intercostal member 22 which in turn is mounted to a bulkhead 24 of the fuselage.

To remove cabinet 10, two bolts 16 are removed from the lower mounts 12 and sliding pins 18 are retracted from the upper mounts 14 and the back mounts 15 whereby the cabinet is ready for removal within a matter of seconds. In lighter cabinets, the back mounts 15 are not required.

When the quick release mounting system of the present invention is utilized in partitions rather than cabinets, there is an additional requirement to prevent sliding pin 18 from pulling out of upper sleeve mount 14 since a partition under load could buckle in bending and pull unrestrained pin 18 from the upper mount 14. A different type of sliding pin 44, as shown in FIG. 7, would be utilized in a partition configuration, whereby the pin 44 actually is a locked in mount 14 due to the action of four ball bearings 48, which are held in an extended position by a spring biased actuating pin 46. To remove locking pin 44, actuating pin 46 is first depressed, allowing the balls 48 to retract within the outside diameter of pin 44 and allow the pin to be removed from sleeve mount 14. Pins 44 is common in the prior art.

While the present invention has been described with respect to specific preferred embodiments, numerous modifications will suggest themselves to those of ordinary skill in the art and accordingly the scope of the present invention is to be measured only by that of the appended claims:

I claim:

1. An insulated quick release cabinet mounting system for attachment of cabinets or partitions to the structural elements of an aircraft fuselage comprising:

a cabinet having side walls and a bottom;

at least one insulated first mount position under the cabinet for releasably supporting the cabinet and attached to a structural element of the fuselage;

a removable fastening member connecting the cabinet to said first mount preventing horizontal, vertical and lateral movement of the cabinet;

at least one insulated second mount positioned substantially above the cabinet attached to a structural element of the fuselage which mount includes an insulated sleeve; and a retractable pin supported on said cabinet for axial movement into engagement with said insulated sleeve to prevent horizontal movement of said cabinet.

2. An insulated quick release cabinet mounting system, as set forth in claim 1, including: a third cabinet mount positioned behind the cabinet and mounted on a structural element of the fuselage, the mount including an insulated vertically extending oblong slot and a retractable pin supported on said cabinet for axial movement into engagement with said oblong slot to prevent horizontal movement of said cabinet.

3. An insulated quick release cabinet mounting system, as set forth in claim 1, including: a third cabinet mount positioned behind the cabinet and mounted on a structural element of the fuselage, the mount including an insulated vertically extending oblong slot and a retractable pin supported on said cabinet for axial movement into engagement with said oblong slot to prevent horizontal movement of said cabinet, while permitting vertical movement of pin in the oblong slot.

4. An insulated quick release cabinet mounting system, as set forth in claim 1, including: the retractable pin including a releasable locking means in the pin for locking the pin in the insulated sleeve of the second mount.

5. An insulated quick release cabinet mounting system, as set forth in claim 1, including: a pin support bracket having a slot therein positioned parallel to the retractable pin, a second pin mounted on the front pin and extending laterally therefrom into the support bracket slot, thereby permitting limited movement of the retractable pin.

6. An insulated quick release cabinet mounting system, as set forth in claim 1, including: a pin support bracket having a slot therein positioned parallel to the retractable pin, a second pin mounted on the front pin and extending laterally therefrom into the support bracket slot, thereby permitting limited movement of the retractable pin and bracing means on the retractable pin urging the retractable pin toward its fully extended position.

7. An insulated quick release cabinet mounting system, as set forth in claim 1, including: a pin support bracket having a slot therein positioned parallel to the retractable pin, a second pin mounted on the front pin and extending laterally therefrom into the support bracket slot, thereby permitting limited movement of the retractable pin and an offset notch in said slot for engagement of said second pin to hold the retractable pin in its retracted position.

* * * * *